United States Patent [19]

Egan et al.

[11] 4,444,713
[45] Apr. 24, 1984

[54] DECORATIVE ORNAMENTATION FOR A RUBBER ARTICLE AND METHOD OF MAKING SAME

[75] Inventors: William E. Egan, Tallmadge; Samuel P. Landers, Uniontown, both of Ohio; Stephen Lash, Birmingham, Mich.

[73] Assignee: The Goodyear Tire & Rubber Company, Akron, Ohio

[21] Appl. No.: 406,743

[22] Filed: Aug. 9, 1982

[51] Int. Cl.³ .............................................. B29H 5/02
[52] U.S. Cl. ................................. 264/326; 425/28 D
[58] Field of Search ....................... 264/326; 249/141; 425/28 R, 28 D, 35, 44

[56] References Cited

U.S. PATENT DOCUMENTS

| | | | |
|---|---|---|---|
| 1,567,402 | 12/1925 | Venn | 425/35 |
| 2,296,016 | 9/1942 | Bostwick | 425/28 D |
| 2,679,663 | 6/1954 | Schwemler et al. | 425/28 D |
| 2,976,571 | 3/1961 | Moslo | 249/141 |
| 3,151,360 | 10/1964 | Jurgeleit | 249/141 |
| 3,518,335 | 6/1970 | Jablonski | 425/44 X |

*Primary Examiner*—J. Howard Flint, Jr.
*Attorney, Agent, or Firm*—Frank Pincelli

[57] ABSTRACT

A rubber article having an indicium on the surface of said article, characterized by said indicium having a surface of a first finish, the surface of said article substantially surrounds said indicium having a second finish which is different from said first finish such that a readily visual distinguishable appearance can be seen between the surface of said indicium and the surface substantially surrounding said indicium.

6 Claims, 5 Drawing Figures

DECORATIVE ORNAMENTATION FOR A RUBBER ARTICLE AND METHOD OF MAKING SAME

The foregoing abstract is not to be taken as limiting the invention of this application, and in order to understand the full nature and extent of the technical disclosure of this application, reference must be made to the accompanying drawings and the following detailed description.

This invention relates to a distinctive indicia for rubber articles and a particular method of providing same. The present invention is especially adapted for use in the sidewall of a tire.

In the prior art it has become very popular to provide decorative ornamentation on the sidewall of the tire. The most common decorative feature found on the sidewall of the tire is a raised or recessed colored ring which is most often white in color. It is also common in the prior art to provide the sidewall of the tire with large raised colored letters. Additionally, in the prior art it is known to provide serrated lettering in the sidewall of the tire. However, the prior art has various problems, for example the prior art requires special rubber compounds to obtain the desired color, decorative feature or environmental protection. The serration or raised ring or letters may have problems with the trapping of air in the mold during vulcanization or releasing from the mold after it has been cured. Additionally, the raised or recessed decorative features are often difficult to keep clean and provide crevices for the trapping of dirt and foreign matter. Further, the decorative features of the prior art generally provide sharp edges or lines in the sidewall of the tire which may provide starting points for the propagation of sidewall cracks and thereby restricts their placement on the sidewall of the tire.

Applicants have discovered a novel and distinctive indicia for the surface of rubber articles and a novel method for producing same which is capable of providing decorative ornamentation in the sidewall of the tire without the problems of the prior art. Additionally, the present invention has advantages in aerodynamic styling and potential weight and material savings.

DETAILED DESCRIPTION OF THE DRAWINGS

Figure 1:
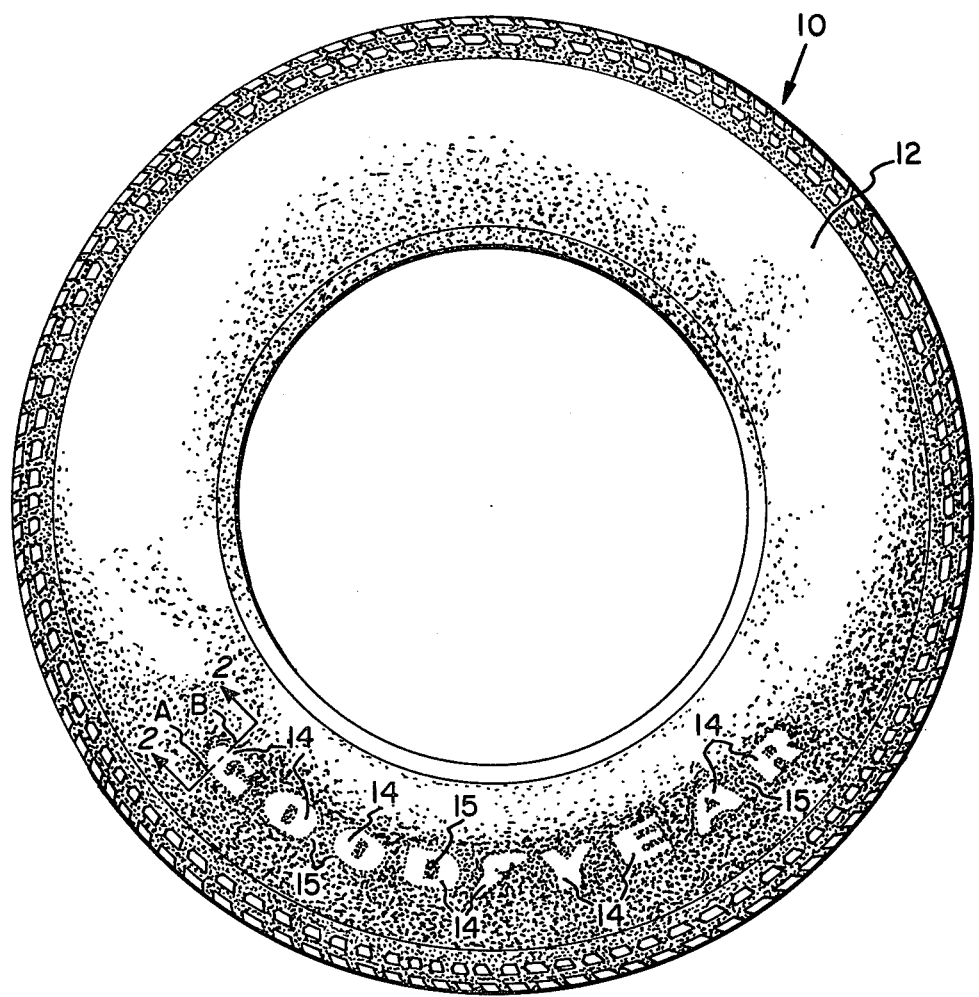
FIG. 1 is an elevational side view of a pneumatic tire provided with indicia made in accordance with the present invention.

Referring to FIG. 1, there is illustrated a pneumatic tire 10 having a sidewall portion 12. Formed on the surface of the sidewall portion 12 is indicia 14 made in accordance with the present invention. In the present embodiment, indicia 14 comprises a plurality of letters which in the present invention spells Goodyear. However, the present invention is not limited to such and may comprise any desired form or configuration. For example, as illustrated in FIG. 1, the figure of the Wingfoot between the D and the Y is made in accordance with the present invention. The visual contrast in appearance of indicia 14 is accomplished by providing the indicia with a surface finish different from that of the area which substantially surrounds each indicium so as to provide an indentifiable indicium. In the particular embodiment illustrated, the surrounding area 15 of sidewall 14 completely surrounds each element of the indicia. The surface finish of indicia 14 is sufficiently different from the surface finish of the surrounding surface area 15 so that a visual distinction can be readily observed by a person having normal eye sight, generally at a distance of about ten feet. This visual contrast can be obtained by having the surface finish of surface 14 be at least thirty microinches ($30$) different than the surrounding area 15, preferably of at least forty microinches ($40$). In the particular embodiment illustrated, the indicia 14 has a surface finish no greater than about 10 microinches ($10$) whereas the surrounding area 15 has a surface finish of approximately 50 microinches ($50$). In the particular embodiment illustrated, the surface finish of indicia 14 was obtained by polishing the area of the mold that forms the indicia by a polishing procedure. However, the present invention is not limited to such. Any means for obtaining the desired finish may be used. In a typical normal pneumatic passenger tire, the surface finish is approximately thirty microinches. However, in the present invention the mold used to make the tire in the surrounding area 15 was sandblasted so as to provide a dull surface finish of approximately fifty microinches ($50$). The surrounding area 15 should not have a finish greater than 250 microinches ($250$) and preferably less than 125 microinches ($125$).

For futher description as to surface finish and roughness, applicants hereby incorporate by reference "Graphic Science" Engineering Drawing Descriptive Geometry Graphical Solutions by Thomas E. French and Charles J. Vierck published by the McGraw Hill Company, Inc. 1958., and in particular Section 10.60 and 10.61. Applicants also incorporate by reference herein "Machinery Handbook" for the machine shop and drafting-room by Erik Oberg and F. D. Jones, 15th Edition, Second Printing, Holbrook L Horton, editor, published by Machinery Publishing Company, copyrighted 1955, and in particular pages 292–293. These two references describe quite clearly, define and discuss surface finishes and how the finishes can be measured. The degree of surface roughness may be measured at the maximum peak-to-valley height, average peak-to-valley height, or average deviation from the mean (root-mean-square value). For the purpose of this invention, the latter method of measurement is used.

In the preferred embodiment of the present invention, the indicia 14 is flush with the surrounding area 15 of sidewall portion 12. This allows the sidewall surface to provide an aerodynamically smooth sidewall surface. This is in complete contrast to the prior art wherein raised or recessed portions are provided in the sidewall portion. If desired, the indicia of the present invention may be extended above or below the outer surface of the tire, preferably no greater than 0.03 inches.

The sidewall 14 may be made of various rubbers normally used for tire sidewalls. The sidewall 14 is preferably composed of at least one rubber selected from butyl rubber, halobutyl rubber and EPDM rubber. EPDM rubber is well known to those skilled in the art as an ethylene/propylene/diene rubber terpolymer comprised of units derived from ethylene, propylene and a minor portion (about 5 to 15 weight percent) of a non-conjugated diene in which the weight ratio of ethylene to propylene is approximately in the range of about 1:4 to about 4:1. Halobutyl rubber is a typical halogen-substituted butyl rubber with various halogen radicals such as chlorine, bromine, fluorine and iodine. Generally preferred are chlorobutyl rubber and bromobutyl rubber.

It is understood by those skilled in the art that various compounding ingredients can be mixed with the rubbers such as for example curatives, zinc oxide, stearate, or stearic acid, anti-oxidants, anti-ozonants, accelerators, pigments, carbon black and fillers.

Preferably the sidewall 14 is made of a rubber which does not contain waxes, anti-ozonants or anti-oxidants which form a protective layer on the sidewall surface as this layer would reduce the effective visual appearance of the indicium over a period of time.

Figure 2:
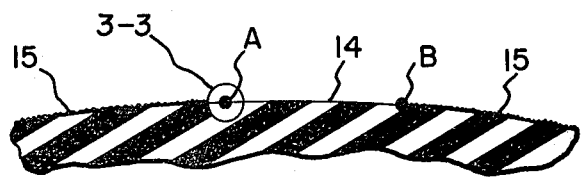
FIG. 2 is an enlarged fragmentary cross-sectional view taken along lines 2—2 of FIG. 1.
Figure 3:
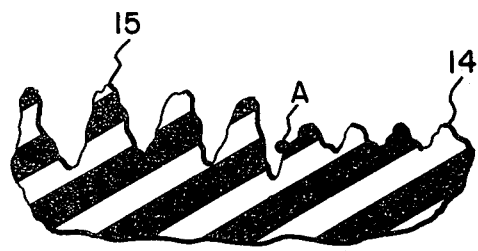
FIG. 3 is an enlarged fragmentary view of the portion of FIG. 2 which is circled.

Referring to FIG. 2, there is illustrated an enlarged fragmentary cross-sectional configuration of a tire 10 taken along line 2—2 of FIG. 1. The points A and B illustrate the boundary of the indicium, i.e. the termination point between the smooth surface of the indicium 14 and the relative rough surface of the surrounding surface 15. Referring to FIG. 3, there is illustrated a greatly enlarged view of that portion of the tire sidewall described in FIG. 2 which illustrates the termination point A separating indicium 14 from surrounding surface 15. FIG. 3 graphically illustrates the general form of the surface roughness of the tire.

Figure 4:
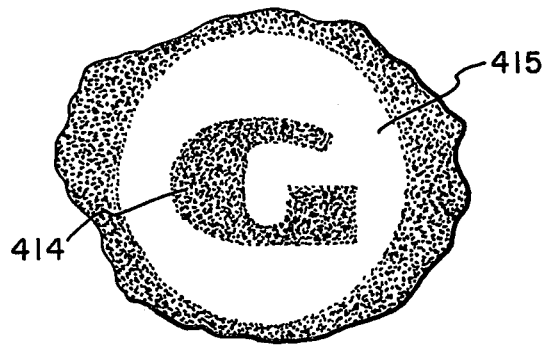
FIG. 4 is a fragmentary elevational side view of a pneumatic tire provided with a modified indicium made in accordance with the present invention.

Referring to FIG. 4, there is illustrated a modified form of the present invention wherein indicia 414 has a rougher finish than the surrounding surface area 415. The finish for indicia 414 is identical to the finish of surrounding surface area 15 of FIG. 1 and the surrounding surface 415 has the same finish as indicia 14 of FIG. 1. The finish for indicia 414 and surrounding surface area 415 are within the same surface finish limits for the surrounding surface area 15 and indicia 14, respectively. In the particular embodiment illustrated in FIG. 4, the surrounding surface area 415 is illustrated in the form of a circle surrounding the indicia. However, the present invention is not limited to such. The surrounding surface 415 may take any desired shape or configuration desired. For example, a triangle, rectangle or any other configuration. Additionally, if desired, the surrounding surface may only partially surround indicia 414. All that is required is that the indicia be substantially surrounded by a surface area having a different finish.

Figure 5:
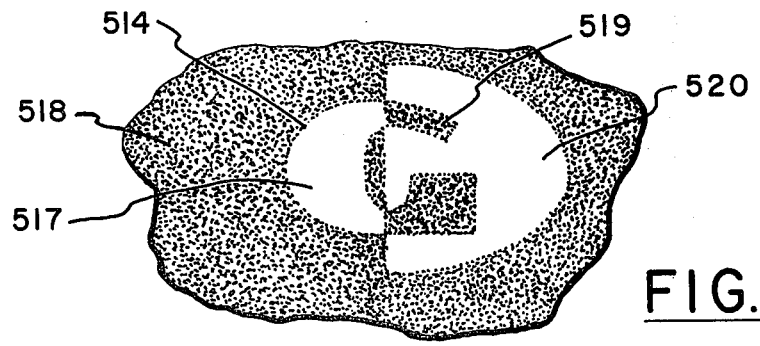
FIG. 5 is an enlarged fragmentary elevational view of a pneumatic tire provided with yet another modified indicium made in accordance with the present invention.

Referring to FIG. 5, there is illustrated yet another modified form of the present invention wherein the indicia 514 is divided into two regions wherein region 517 is smooth and the surrounding surface area 518 is rough in comparison and region 519 with surrounding surface area 520. The region 519 being rough and the surrounding surface area 520 being smooth. FIG. 5 illustrates but one example of indicia having more than one type finish. It is contemplated within the scope of the invention that various other combinations of similar type combinations of finishes may be used which are not illustrated. Further, if desired, three or more different surface finishes may be used.

Tires having indicia made in accordance with the present invention have been found to have numerous beneficial aspects over the prior art. For example, indicia in the present invention are made on the sidewall of a tire having a single color, normally black as opposed to special white letters or rings in the prior art, thereby eliminating a need for a special more expensive colored compound. Additionally, the lettering of the present invention may be provided so as to be flush with the surrounding sidewall surface of the tire so as to provide a smooth overall sidewall surface thereby minimizing the aerodynamic drag on the tire. Additionally, the indicia of the present invention avoids unnecessary sharp edges or lines in the sidewall of the tire surrounding the indicia which can have an adverse effect on the formation and propagation of sidewall cracks. Further, the indicia of the present invention avoids mold release problems that are present in indicia in projections such as raised white letters or serrations placed in the sidewall of the tire. Additionally, since the indicia does not introduce any stress points, they may be placed anywhere on the sidewall of the tire without fear of increasing sidewall stresses in that area. Furthermore, the indicia of the present invention avoids the problem of air trapping during vulcanization of the tire in the mold. The present invention also has the advantage of having potential weight and material savings by minimizing the additional material needed for the indicia in the sidewall of the tire.

In accordance with the present invention, the providing of the indicia surface with a finish different from the surrounding area provides an indicia having quite a distinct visual appearance from the surrounding area of the rubber article. In a tire made in accordance with the present invention, it has been determined that an indicia having a surface finish of 10 microinches and a surrounding surface area 15 having a finish of 50 microinches, the light reflectivity as measured by a Milota one degree (1°) spot meter (which is accurate to within plus or minus 0.1 of a stop) has a twenty percent difference in light reflectivity. The light reflectivity being measured substantially perpendicular to the surface being measured.

In accordance with the present invention, the indicia is formed on an elastomeric article when in the mold during vulcanization. The unvulcanized tire of the present invention is placed in the mold in which it is to be vulcanized under pressure and heat to its final form. The sidewall 14 of the tire 10 is subject to sufficient pressure so as to cause the surface finish of the mold to be imparted to the tire. Typical pressures used in the prior have been found to be more than adequate to transfer the mold finish to the tire. During vulcanization pressure is applied to the internal cavity of the tire so that the unvulcanized tire is forced against the mold thereby forming the outer surface of the article. In the region in which the indicia is formed in the mold, the finish of the mold is within the limits desired for the finish of the indicia. The surrounding surface area around the indicia has a finish within the desired limits equal to the finish of the surrounding surface area 15 of tire 10. As previously stated, the portion of the mold which is to form the indicia 14 has been hand polished to obtain the desired degree of finish. However, various other methods may be used to obtain the desired finish. It is well known in the art that various mold release agents may be used during vulcanization of the tire. Accordingly, this should be taken into account in determining the appropriate finish to be made in the mold to be imparted to the tire. Should the mold release provide a surface finish on the article smoother than desired, the mold surface should be made rougher and vice versa should the mold release agent provide a rougher surface finish on the article, then the surface of the mold should be made smoother. Preferably, little or no mold release agent should be used which would interfere with the molding process wherein the finish from the mold is imparted to the tire. In measuring the surface finish of the tire, this should be done on a new tire which has been thoroughly cleaned and free of any grease or oil.

It will be apparent to those skilled in the art that various changes and modifications can be made without departing from the spirit or scope of the present invention. For example, and not by way of limitation, the present invention is also equally applicable to a variety of elastomeric articles that are vulcanized in molds under pressure.

We claim:

1. The method of providing an indicium on the surface of an article made of a vulcanizable material comprising:

placing an unvulcanizable article in a mold, said mold having a first surface area of a first surface finish for forming said indicium and a second surface area of a second surface finish different from said first surface finish which substantially surrounds said indicium;

vulcanizing said article by applying heat and pressure so as to force the article against said mold thereby imparting to said article an indicium having a first surface finish and the area substantially surrounding said indicium having a second finish, said first and second finishes of said article being visually distinguishable from each other, said first and second finishes of said article being less than or equal to two hundred fifty (250) microinches.

2. The invention according to claim 1 where the differences between said first and second finishes of said article is at least thirty (30) microinches.

3. The invention according to claim 1 wherein the differences between said first and second finishes of said article is at least forty (40) microinches.

4. The invention according to claim 1 wherein said first and second finishes of said article being equal to or less than one hundred twenty five (125) microinches.

5. The invention according to claim 1 wherein said first surface finish of said indicium being about ten (10) microinches and said second surface finish of said area substantially surrounding said indicium being about fifty (50) microinches.

6. The invention according to claim 1 wherein said first surface finish of said indicium being about fifty (50) microinches and said second surface finish of said area substantially surrounding said indicium being about ten (10) microinches.

* * * * *